United States Patent
Smiley

(10) Patent No.: US 6,929,158 B2
(45) Date of Patent: Aug. 16, 2005

(54) DISPENSER FOR DELIVERING AN ADJUSTABLE VOLUME OF FLOWABLE DRY MATERIAL

(75) Inventor: Charles F. Smiley, Waunakee, WI (US)

(73) Assignee: Traex Company, Toledo, OH (US)

( * ) Notice: Subject to any disclaimer, the term of this patent is extended or adjusted under 35 U.S.C. 154(b) by 62 days.

(21) Appl. No.: 10/639,568

(22) Filed: Aug. 12, 2003

(65) Prior Publication Data

US 2004/0031819 A1 Feb. 19, 2004

Related U.S. Application Data

(60) Provisional application No. 60/403,735, filed on Aug. 14, 2002.

(51) Int. Cl.[7] ............................. G01F 11/10; G01F 11/28
(52) U.S. Cl. ........................ 222/366; 222/438; 222/440; 222/449
(58) Field of Search ................................. 222/158, 361, 222/366, 434, 438, 440, 449, 450

(56) References Cited

U.S. PATENT DOCUMENTS

| | | | |
|---|---|---|---|
| 559,386 A | 5/1896 | Jones | |
| 1,106,686 A | * 8/1914 | Swarovski et al. | 222/308 |
| 1,891,038 A | * 12/1932 | Barros | 222/438 |
| 2,561,696 A | 7/1951 | Hammer | |
| 4,109,835 A | 8/1978 | Castro | |
| 4,174,058 A | * 11/1979 | Bassignani | 222/438 |
| 4,531,658 A | * 7/1985 | Galopin | 222/181.2 |
| 4,560,092 A | * 12/1985 | Souza | 222/168 |
| 4,955,510 A | * 9/1990 | Newnan | 222/305 |
| 5,097,704 A | * 3/1992 | Ford | 73/429 |
| 5,685,461 A | * 11/1997 | Mitchell | 222/184 |
| 5,855,300 A | 1/1999 | Malki | |
| 5,934,573 A | * 8/1999 | Weterrings et al. | 239/650 |

* cited by examiner

Primary Examiner—Joseph A. Kaufman
(74) Attorney, Agent, or Firm—MacMillan, Sobanski & Todd, LLC

(57) ABSTRACT

A dispenser for granular material having a container for storing the material. The container is connected to a dispensing assembly having a chamber in removable communication with the container. The volume of the chamber is controlled by an insert that is installed in one of several positions and orientations within the chamber to determine the amount of material to be dispensed from the container.

13 Claims, 6 Drawing Sheets

DISPENSER FOR DELIVERING AN ADJUSTABLE VOLUME OF FLOWABLE DRY MATERIAL

CROSS-REFERENCE TO RELATED APPLICATION

This application relates to and claims the benefit of provisional application No. 60/403,735, filed on Aug. 14, 2002.

BACKGROUND OF THE INVENTION

The present invention relates generally to flowable dry material dispensers, and in particular relates to a dispenser for dispensing a selectively variable volume of granular material.

Dispensing assemblies that are connected to containers for delivering a solid product are well known. For example, U.S. Pat. Nos. 559,386 and 2,561,696 each discloses a dispensing chamber that is initially positioned under an opening from a container such that material from the container fills the chamber. The chamber is then moved over a discharge opening to dispense the material.

Other dispensing apparatuses have been proposed, such as that disclosed in U.S. Pat. No. 4,109,835, whereby a dispensing chamber is fixedly positioned with a filling aperture in a top sliding plate and a discharge aperture in a bottom sliding plate. The plates move together from a first position, whereby the chamber is filled, to a second position, whereby the chamber is emptied. Another such dispenser is disclosed in U.S. Pat. No. 5,855,300.

While these and other types of dispensers are suitable for delivering a predetermined amount of granular material to a food product, they do not allow the user to selectively vary the chamber volume to control the amount of dispensed material. Accordingly, there is a need for a dispenser including a chamber having an internal volume that can be varied by the user to deliver only the desired amount of material to the food product.

BRIEF SUMMARY OF THE INVENTION

In accordance with one aspect of the invention, a dispenser is provided having a container that is capable of housing a volume of material. The container is partially defined by a container wall having an aperture extending therethrough. The dispenser further includes a dispensing assembly having a housing and a sliding member disposed in the housing. The sliding member defines an internal chamber having an open top in removable communication with the aperture, and an open bottom. An insert is configured to be installed within the chamber in one of a plurality of predetermined configurations to define a metered volume within the chamber that is adjustable depending on the configuration of the insert. The sliding member is movable between a first position whereby material is delivered from the container to the chamber and a second position whereby the previously delivered volume of material is dispensed from the chamber.

These and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENTS

Figure 1:
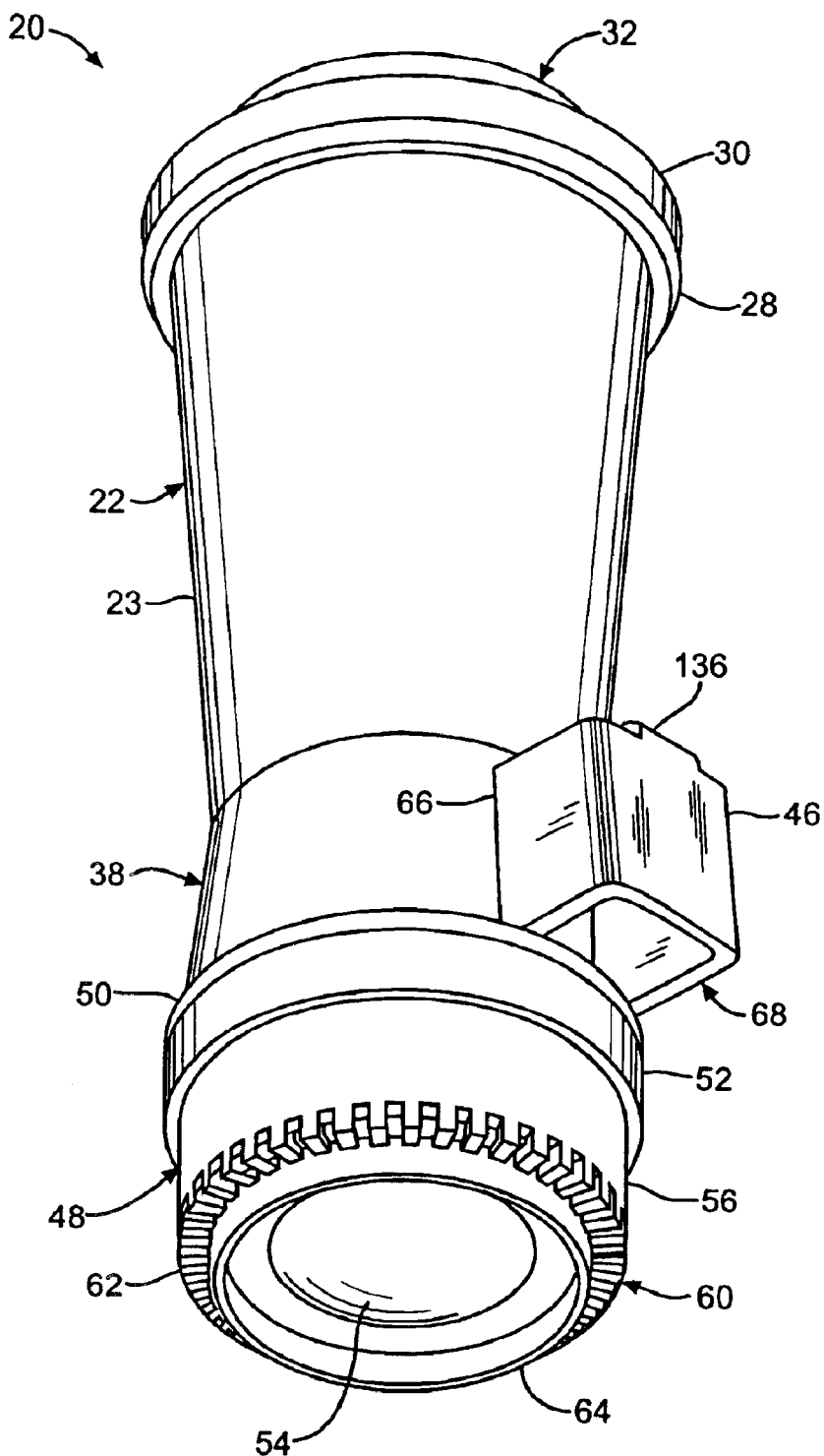
FIG. 1 is a perspective view of a granular material dispenser constructed in accordance with a preferred embodiment of the present invention.
Figure 2:
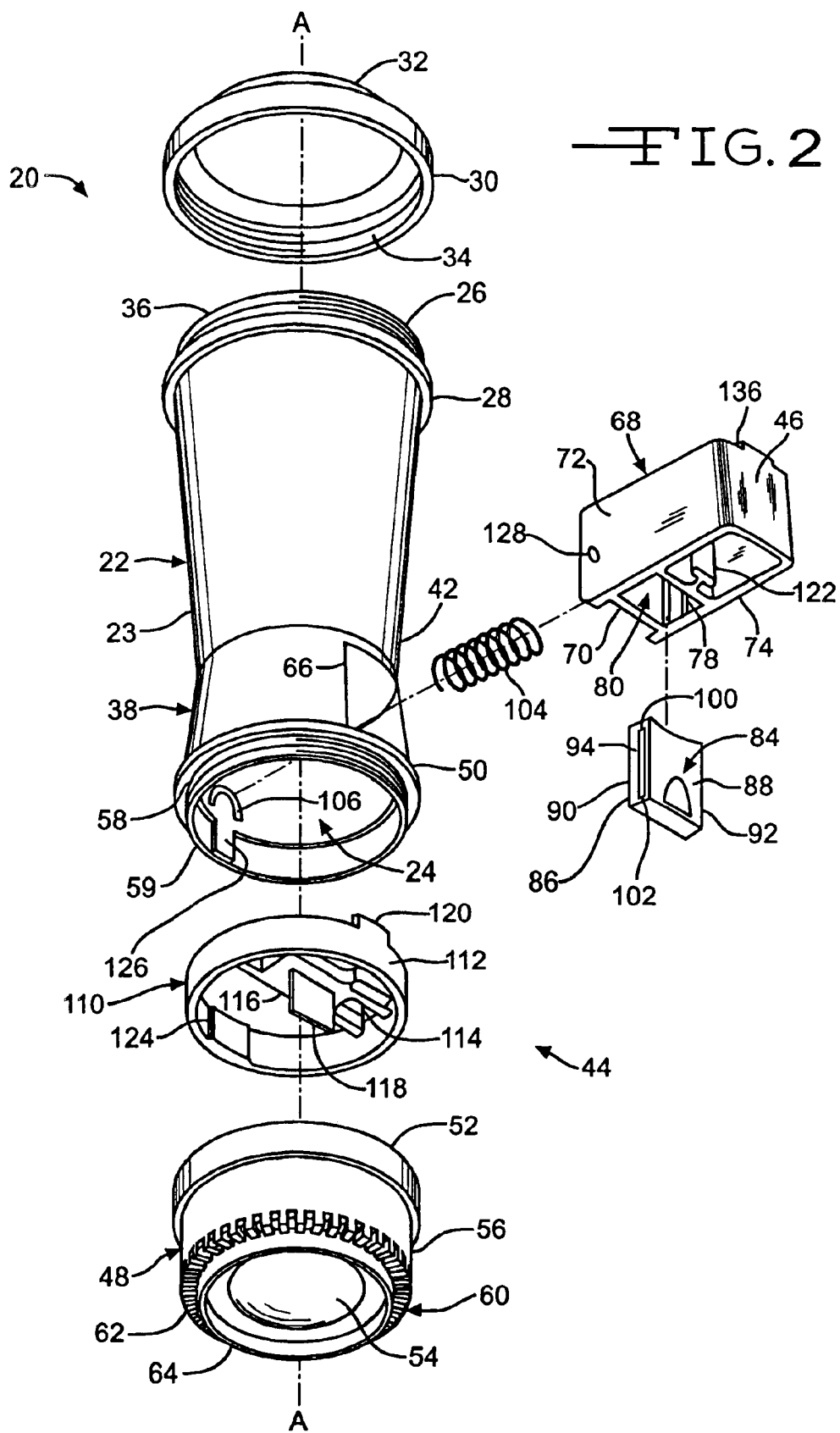
FIG. 2 is an exploded assembly view of the dispenser illustrated in FIG. 1.
Figure 3:
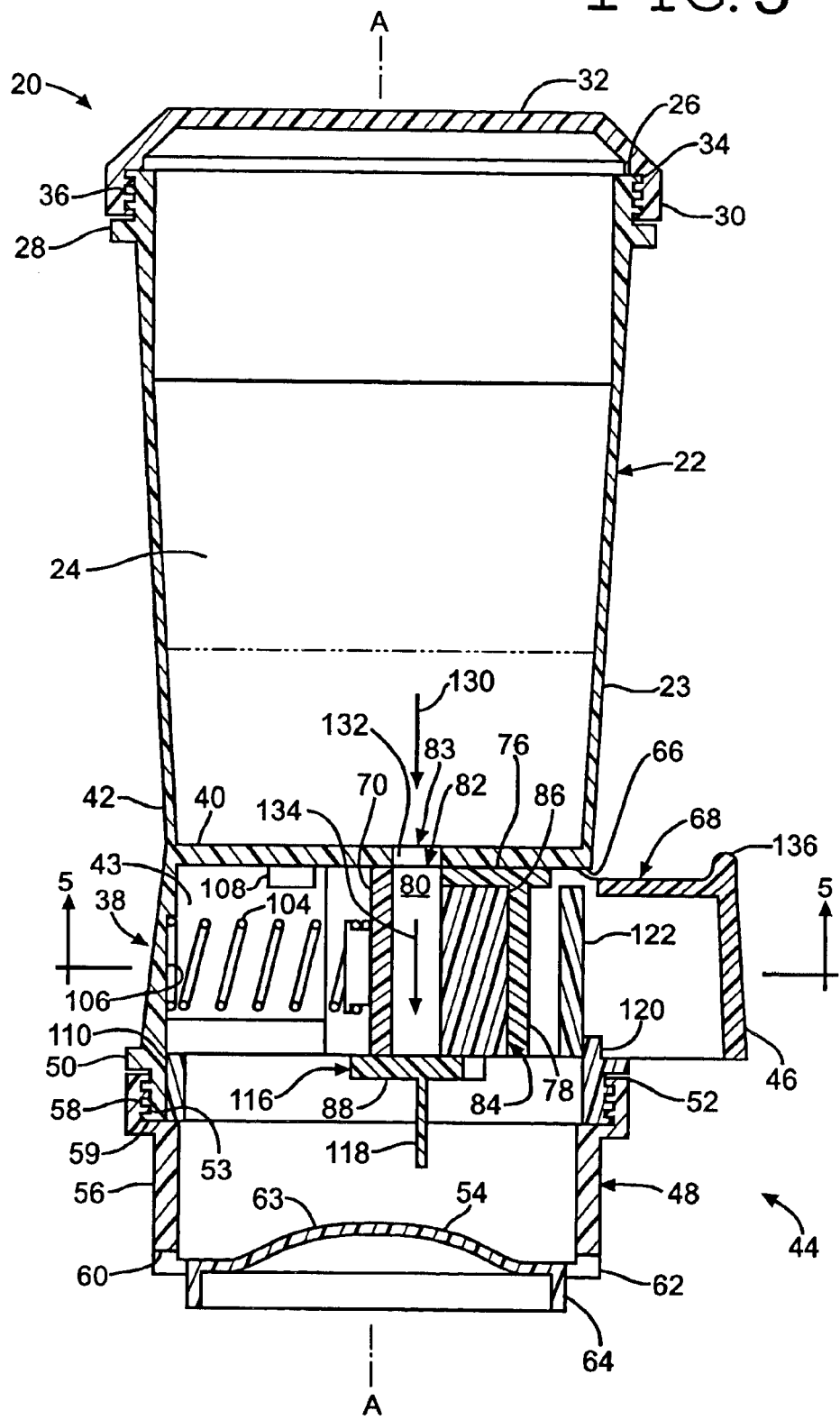
FIG. 3 is a sectional side elevation view of the dispenser illustrated in FIG. 1 in a deactivated "fill" state.

The preferred embodiments and best mode of the present invention will now be described in detail with reference being made to the drawings. Referring to FIGS. 1–3, a dispenser 20 includes a container 22 having a wall 23 axially extending along an axis of extension A—A that defines a void 24 suitable for housing a volume of flowable dry granular material such as salt, sugar, spices, or other condiments. Dispenser 20 is made of an impact resistant thermoplastic or any other material suitable for use in combination with the present invention, as will be appreciated from the description below. Container 22 can be either cylindrical or, more preferably, slightly sloped with respect to the axial direction to define a frusto-conical member having a larger upper end 26 for filling the container 22 with a desired material. As shown in FIG. 3, a base plate 40 extends radially across the lower small end 42 of the container 22 and defines the bottom wall of the container. The container 22 can comprise any suitable size and shape, and has a volume of approximately 225 ml in accordance with the preferred embodiment.

The container 22 includes a flange 28 extending radially outwardly from and circumscribing the upper end 26 that engages the outer rim 30 of a lid 32. In particular, lid 32 is attached to and removed from the container 22 by threads 34 disposed on its inner surface that mate with a threaded outer surface 36 of the container 22. Void 24 is thus defined by the volume within the container 22 between base plate 40 and lid 32. Container 22 is preferably transparent or translucent to enable a user to visually gauge the type and amount of material remaining therein.

A housing 38 is connected, and preferably integrally connected, to the lower end 42 of container 22. Housing 38 is also a frusto-conical member having its small end integrally connected to the small end of container 22. The housing 38 is open so as to define an internal void 43 that enables a dispensing assembly 44 to be installed into, and removed from, the housing 38. As will be described in more detail below, dispensing assembly 44 is adjustable to selectively control the amount of granular material that is to be dispensed during operation.

Dispenser 20 further includes a saucer-shaped diffuser member 48 having a base 54, an upwardly extending cylindrical sidewall 56 extending from the base 54, and an open upper end 52. Diffuser 48 is removably attached to the container by threads 53 disposed on the radially inner surface of sidewall 56 that mate with a corresponding threaded outer surface 58 disposed at the lower end of housing 38. Housing 38 defines a flange 50 that extends radially outwardly from and circumscribes its lower end that engages the upper end 52 of diffuser 48 when the diffuser 48 is attached to the housing 38. The bottom of housing 38 terminates at a rim 59.

Diffuser 48 defines a perforated rim 60 having a plurality of apertures 62 extending therethrough at the interface between sidewall 56 and the radially outer edge of base 54. As shown in FIG. 3, the base 54 of diffuser 48 includes a dome 63 to direct the granular material radially outwardly towards the perforated outer rim 60 and thereby ensure that the material received from the dispensing assembly 44 is delivered in a dispersed manner. An axially extending annular outer rim 64 extends downwardly from base 54 to enable the dispenser 20 to rest on a flat surface such as a countertop or a table in the upright position.

Figure 4:
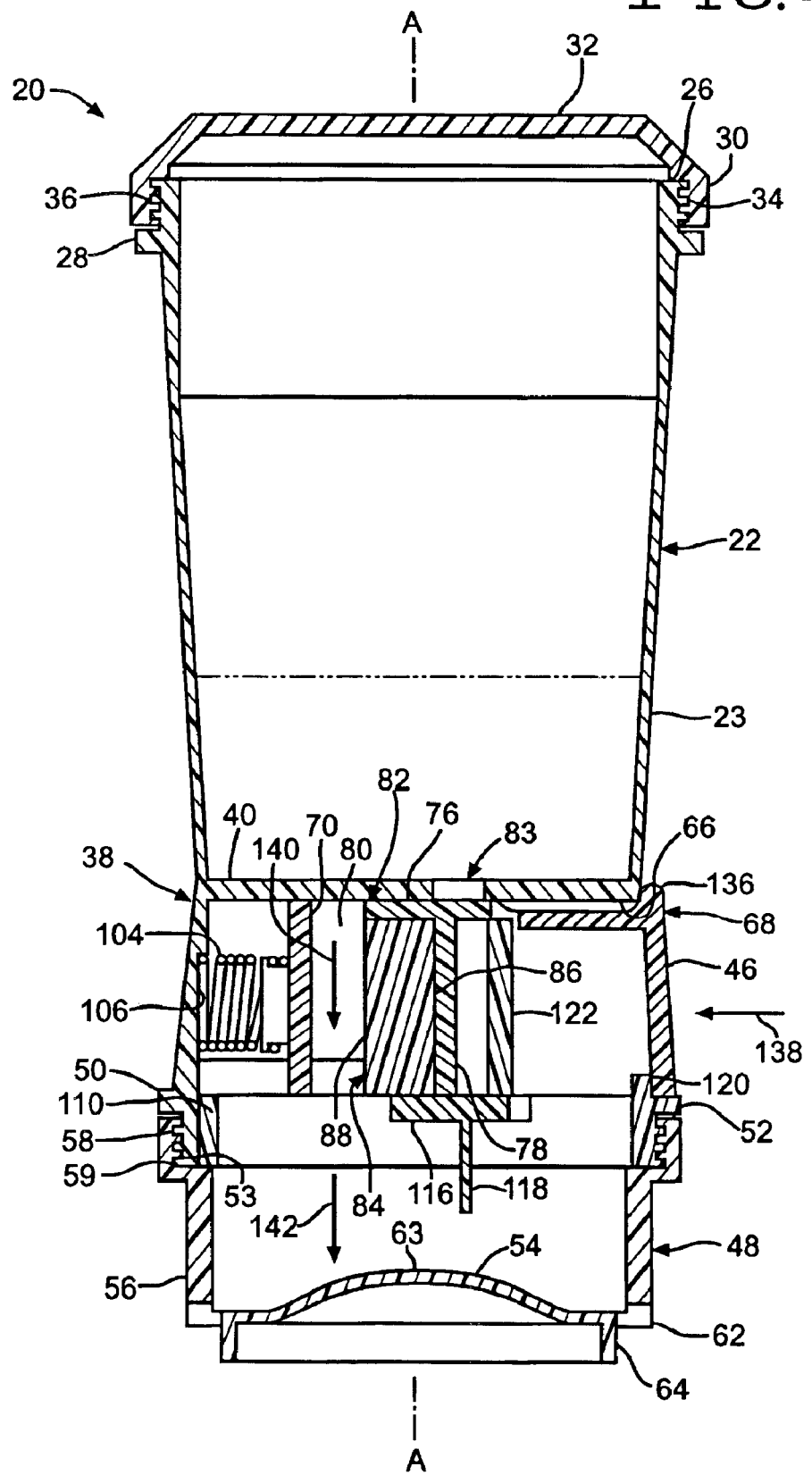
FIG. 4 is a sectional side elevation view of the dispenser illustrated in FIG. 1 in an actuated "dispense" state.

An aperture 66 extends through the wall 23 of housing 38 and enables a sliding block 68 of the dispensing assembly 44 to pass through the housing 38. The outer wall 46 of sliding block 68 provides an actuator that can be depressed inwardly by the user against a spring force to cause block 68 to translate from a normal, deactivated "fill" position as illustrated in FIG. 3 to a "dispense" position as illustrated in FIG. 4, which is described in detail below. Once the user releases the outer wall 46, the block 68 reverts under spring force to the fill position. The outer wall 46 is textured and contoured so as to be comfortably engaged by, for example, the hand of a user. The dispenser 20 is thus designed to be operated using a single hand by gripping the outer surface of container 22, housing 38, and/or diffuser 48 as desired, and operating the block 68 using the thumb, another finger, or the palm of the hand.

The dispensing assembly 44 will now be described in more detail with reference to FIGS. 2 and 3. In particular, sliding block 68 has a generally rectangular cross section and is defined by inner end wall 70, sidewalls 72 and 74, outer wall 46, and upper wall 76. Sliding block 68 has an open bottom. Outer wall 46 is the actuator described above. Outer wall 46 is accessible outwardly from aperture 66 when the dispenser 20 is in the normal "fill" configuration. A middle wall 78 is disposed between inner and outer walls 70 and 46, respectively. Chamber 80 is defined by inner end wall 70, sidewalls 72 and 74, and middle wall 78 within sliding block 68. A rectangular aperture 82 extends through upper wall 76 and is aligned with a corresponding rectangular aperture 83 that extends through the base plate 40 of container 22. Chamber 80 has a metered volume that can be filled by granular material disposed in container 22 during the fill phase as will be described in more detail below. However, as will now be described, the metered volume of chamber 80 is adjustable to vary the amount of material that may be accepted from the container 22 and subsequently dispensed during operation of the dispenser 20.

Referring now also to FIGS. 2 and 5–8, an adjustable insert 84 may be inserted into chamber 80 at one of several predetermined locations. Insert 84 is a generally rectangular block defined by sidewalls 86 and 88, and end walls 90 and 92. A pair of elongated rails 94 protrudes outwardly from end walls 90 and 92 and extends vertically with respect to the dispenser 20 when in an upright position. Rails 94 are offset to one side of the insert 84 from the lateral center plane of the insert 84 and are sized to be selectively inserted into one of two sets of corresponding vertically extending grooves 96 and 98 that are formed in the sidewalls 72 and 74 of the sliding block 68. In particular, rails 94 extend only partially along end walls 90 and 92, and have an insertion end 100 (FIG. 2) sized to slide into corresponding grooves 96 and 98. Rails 94 further include a distal end 102 (FIG. 2) having a greater thickness than insertion end 100. Insert 84 is thus keyed to prevent its installation into sliding block 68 in an upside-down orientation.

Grooves 96 and 98 are disposed at predetermined locations to enable one to administer a predetermined amount of material by varying the volume of chamber 80 based on the position of insert 84 within the sliding block 68. In particular, grooves 96 are displaced outwardly with respect to the grooves 98. Rails 94 are positioned off-center with respect to walls 90 and 92 so as to enable the volume of chamber 80 to be adjustable based not only the position of insert 84, but also on the orientation of insert 84, to provide greater flexibility as will now be described.

Figure 5:
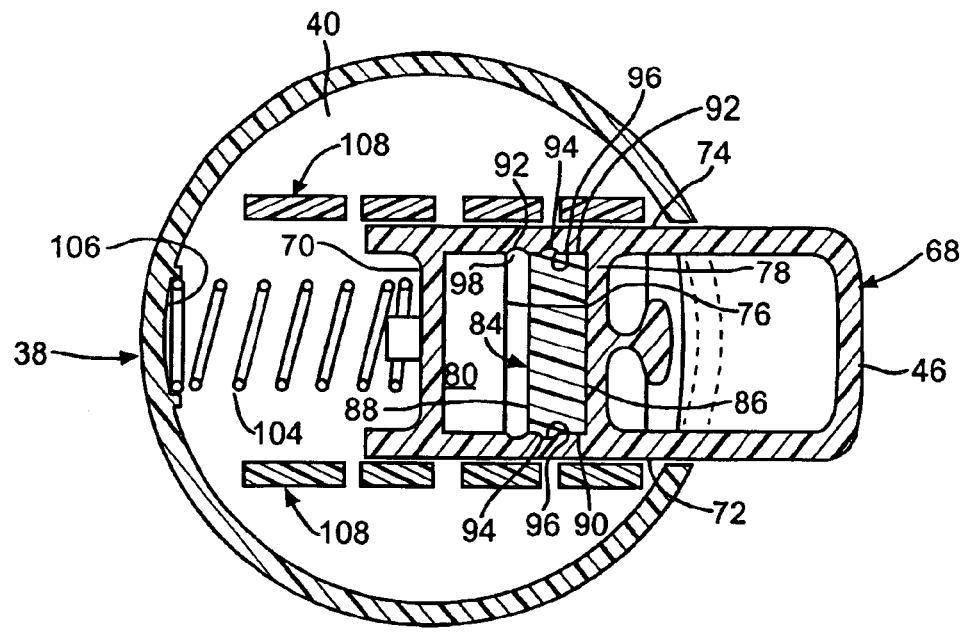
FIG. 5 is a sectional view taken along line 5—5 of FIG. 3 showing a variable-size chamber in a maximum size configuration.

Referring to FIG. 5, insert 84 can be positioned such that wall 86 faces axially outwardly. Rails 94 are positioned closer to wall 88 such that, when the rails 94 are installed in grooves 96 in this orientation, wall 86 is disposed immediately adjacent middle wall 78 to maximize the metered volume of chamber 80 between wall 88 and wall 70. When the insert 84 is installed in this first orientation and position, chamber 80 has a metered volume of approximately 5 ml that will be filled with the granular material from container 22 during the "fill" phase and subsequently dispensed during the "dispense" phase. It is envisioned in accordance with the preferred embodiment that this will produce approximately 6 grams of salt. It should be appreciated that referring to the weight of salt dispensed throughout this disclosure assumes a sifted salt with a bulk density of 1185–1250 g/l, and is generally plus or minus 0.4 grams. The weight of other dispensed granular materials will differ, as the present invention contemplates, to control the dispersal of other granular materials such as spices and the like.

Figure 6:
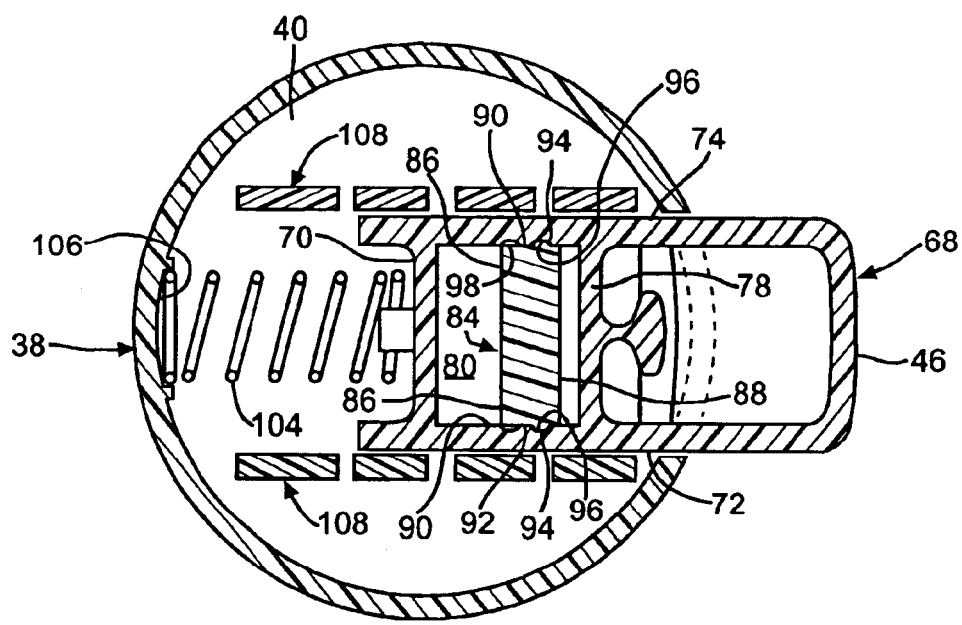
FIG. 6 is a sectional view similar to FIG. 5 in which the chamber is shown in the next size smaller configuration.

Referring to FIG. 6, the insert 84 can be installed in an orientation opposite that illustrated in FIG. 5 such that wall 88 faces outwardly. Because rails 94 are positioned closer to wall 88, when the rails 94 are installed in outer grooves 96, a gap is formed between wall 78 and insert 84 that correspondingly reduces the metered volume of chamber 80. When the insert 84 is installed in this second orientation and position, chamber 80 has a metered volume of approximately 4.2 ml. It is envisioned in accordance with the preferred embodiment that this will produce approximately 5 grams of salt.

Figure 7:
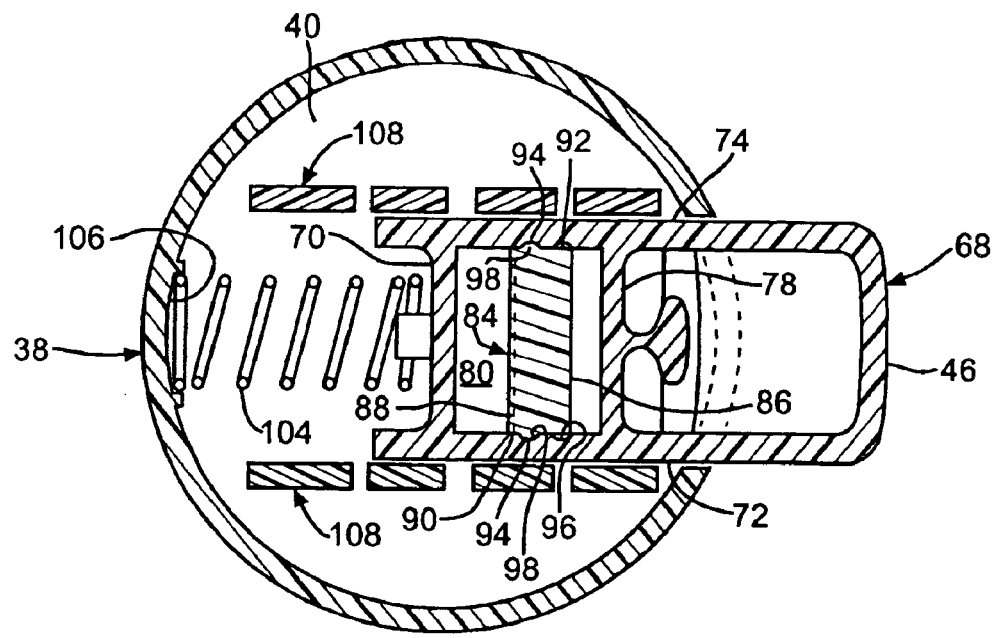
FIG. 7 is a sectional view similar to FIG. 5 in which the chamber is shown in the next size smaller configuration.

Referring to FIG. 7, insert 84 can be installed in the orientation illustrated in FIG. 5 (i.e., wall 86 facing outwardly), but such that the rails 94 are disposed in inner grooves 98. When insert 84 is installed in this third orientation and position, the gap between walls 78 and 86 is larger than that achieved in the second orientation and position, to reduce the size of chamber 80 to approximately 3.3 ml. It is envisioned in accordance with the preferred embodiment that this will produce approximately 4 grams of salt.

Figure 8:
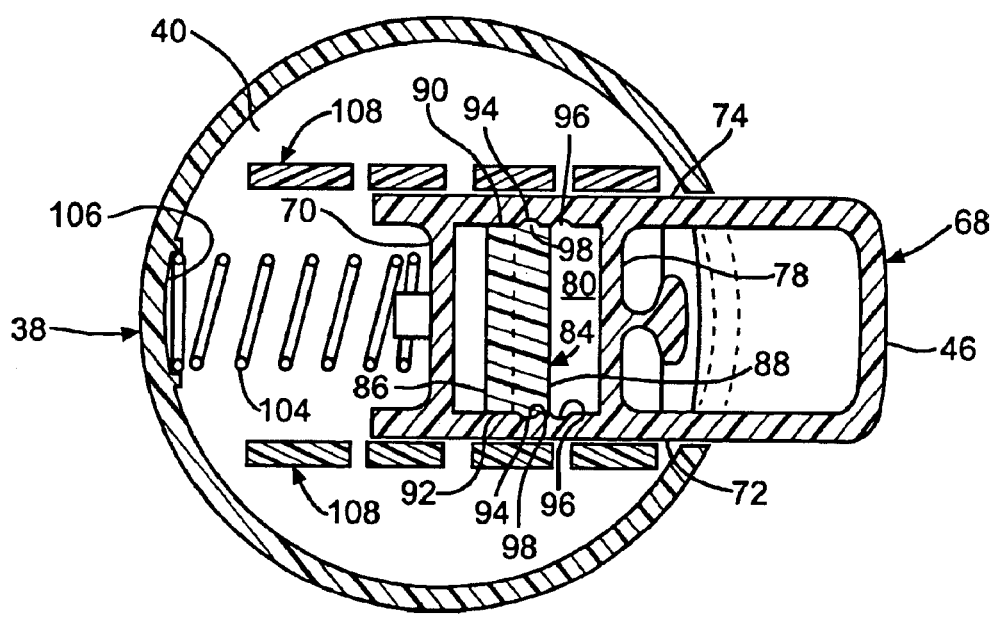
FIG. 8 is a sectional view similar to FIG. 5 in which the chamber is shown in the smallest configuration.

Referring to FIG. 8, insert 84 can be installed such that wall 88 faces axially outwardly and rails 94 are disposed in inner grooves 98. When insert 84 is installed in this fourth orientation and position, the gap between wall 78 and insert 84 is larger than that achieved in the third orientation and position, which reduces the volume of chamber 80 to approximately 2.5 ml. It is envisioned in accordance with the preferred embodiment that this will produce approximately 3 grams of salt.

As described above, when insert 84 is installed into sliding block 68, the metered volume of chamber 80 is defined by inner wall 70, sidewalls 72 and 74, and the insert 84. Insert 84 thus provides an adjustable wall that may be selectively positioned and orientated by the user as desired to, in turn, adjust the metered volume of chamber 80 and corresponding amount of granular material that is received from container 22 and subsequently dispensed in a given "dispense" phase. The size of chamber 80 can be further varied, for example, by adjusting the thickness of insert 84, the position of rails 94, position of walls 70, 72, and 74, and the position of grooves 96 and 98. All such variations are contemplated by the present invention and, accordingly, the invention is not to be limited to the volumes described above with reference to FIGS. 5–8. While granular material would flow into chamber 80 when insert 84 is not installed, dispenser 20 is intended to be operated only when the insert 84 is installed to prevent the material from being dispensed unchecked when the dispensing assembly 20 is in the "fill" configuration.

Referring to FIGS. 2 and 3, one end of a coil spring 104 is connected to the outer surface of the inner wall 70 of sliding block 68. The other end of spring 104 is partially supported by an inverted "U" shaped protrusion 106 that extends slightly radially inwardly from the inner surface of housing 38 at a location radially opposite to aperture 66. Protrusion 106 has a radius of curvature matching that of the end of coil spring 104. When sliding block 68 is installed into the housing 38, spring 104 becomes compressed and biases the block 68 laterally outwardly, perpendicular to the axis of extension A—A of container 22.

As shown in FIGS. 3 and 5, a plurality of guide rail segments 108 is disposed on the lower surface of base plate 40 and extends downwardly therefrom. Segments 108 are arranged in two columns that are spaced apart at a sufficient distance such that sliding block 68 fits slideably, without excessive play, therebetween. Segments 108 ensure that the block 68 is guided for proper movement during operation.

Referring to FIGS. 2–4, a pressure plate 110 provides support to the integrity of the dispensing assembly 44, and retains the sliding block 68. Pressure plate 110 includes a cylindrical outer wall 112 that has an outer diameter slightly less than the inner diameter of rim 59 such that plate 110 may be installed therein. A rib 114 structure extends across pressure plate 110 and supports a plate 116 that is centrally positioned with respect to rib 114. Rib structure 114 is positioned such that plate 116 is aligned with chamber 80 when the pressure plate 110 is installed in housing 38. As shown in FIG. 3, when the dispensing assembly 44 is in the "fill" state, plate 116 provides a base for the chamber 80 to prevent spillage and further supports the insert 84. If the insert 84 were to be removed, a gap would exist between the plate 116 and middle wall 78 of sliding block 68 to enable material to be dispensed during the "fill" phase. It should be appreciated that an alternative embodiment of the invention contemplates that plate 116 be designed to extend entirely between walls 70 and 78 to prevent any spillage of granular material during the "fill" phase regardless of whether insert 84 is installed. Referring again to FIG. 3, a gripping tab 118 extends downwardly from plate 116 and is thus accessible to the user to provide for the installation and removal of pressure plate 110, as will be described in more detail below.

Still referring to FIGS. 2–4, a locking tab 120 extends upwardly from outer wall 112 of the pressure plate 110. A corresponding stop 122 is supported by middle wall 78 and extends laterally outwardly therefrom. Tab 120 engages the outer surface of stop 122 to prevent spring 104 from biasing the sliding block 68 too far axially outwardly. More specifically, tab 120 and stop 122 are located to ensure that apertures 82 and 83 are aligned when the tab and stop are engaged under the force of spring 104 during the "fill" state. Advantageously, pressure plate 110 is keyed to ensure that it is installed within housing 38 in the proper position and orientation. As shown in FIG. 2, a notch 124 is formed in the outer surface of outer wall 112 that receives a key 126 in the form of a protrusion that extends radially inwardly from the bottom rim 59 of housing 38 and is sized to fit within notch 124. Notch 124 is only open at the upper end of the pressure plate 110 to prevent the pressure plate from being installed upside-down. Notch 124 provides additional support to properly position spring 104 within the inverted "U" shaped protrusions 106.

The dispensing assembly 44 is assembled by first attaching one end of coil spring 104 to sliding block 68. The sliding block 68 is slid through aperture 66 such that ears 128 that are disposed on walls 72 and 74 slide past the outer wall of housing 38 and lock the sliding block 68 therein. The insert 84 is positioned and oriented to produce the desired yield of granular material when the block 68 is moved to the "dispense" state. The pressure plate 110 is then installed such that notch 124 mates with key 126. The actuator 46 should first be depressed to ensure that the stop 122 of sliding block 68 is disposed inwardly of locking tab 120. Once the pressure plate 110 is installed, the actuator 46 may be released as the sliding block 68 will be properly positioned, as described above. Finally, diffuser 48 is screwed onto the housing 38 in the manner described above. Outer rim 52 of diffuser 48 extends radially outwardly from wall 56 to define an inner lip that is aligned with outer wall 112 of pressure plate 110. The rim 52 prevents pressure plate 110 from becoming disengaged during operation of the dispenser 20.

When the user desires to adjust the volume of chamber 80, the diffuser 48 is unscrewed and removed from housing 38. The pressure plate 110 is then removed using the gripping tab 118 as described above. The insert 84 is then removed and repositioned as described above to produce the desired amount of material. The pressure plate 110 and diffuser 48 are then reassembled as described above.

The dispenser 20 can be disassembled for cleaning. In particular, the lid 32 is unscrewed from the container 22, and the diffuser 48, pressure plate 110, and insert 84 are removed in the manner described above. Next, the sliding block 68 can be slid outwardly until the ears 128 approach the inner surface of the wall of housing 38. Additional force may be required to slide the ears 128 through aperture 66 and remove the sliding block 68 from the housing 38. The dispenser 20 is then cleaned and reassembled for use.

Referring now to FIG. 3, the "fill" state is shown wherein granular material stored in container 22 travels downwardly along the direction of arrow 130, through an intake passageway 132 defined by apertures 83 and 82, and into the chamber 80 along the direction of arrow 134. The force of spring 104 biases the sliding block 86 outwardly to a position to ensure that aperture 82 of upper surface 76 is aligned with aperture 83 of base plate 40. The granular material in container 22 fills the chamber 80 in which the bottom is sealed by plate 116 to prevent any spillage when the insert 84 is installed. Once the chamber 80 is filled, the user can position the dispenser 20 such that the outer rim 62 of diffuser 48 is aligned with a destination (e.g., food product) that is to receive the dispensed granular material.

Referring now to FIG. 4, the user can iterate the dispensing cycle from the "fill" state to the "dispense" state using actuator 46. An actuator stop 136 extends upwardly from the outer surface of wall 46 to provide a stopping mechanism for the sliding block 68, thereby preventing the sliding block 68 from being inserted entirely into the housing 38. To dispense the material that was received by chamber 80 during the previous "fill" state, the actuator 46 is depressed against the spring force along the direction indicated by arrow 138 to remove aperture 82 from alignment with aperture 83, thereby blocking the intake passageway 132 as shown in FIG. 3. The upper surface 76 of sliding block 68 is brought into alignment with aperture 83 to seal the base plate 40 and prevent additional material from flowing out of the container 22. The actuator 46 is further depressed until the stop 136 engages the outer surface of housing 38. The stop 136 is positioned such that a full depression of the actuator 46 will move the plate 116 from alignment with the open bottom of chamber 80. The granular material that was stored in chamber 80 during the previous "fill" state is then released into the diffuser 48 along the direction indicated by arrow 140. The material is directed towards the domed surface 54 along the direction indicated by arrow 142 and is subsequently forced radially outwardly by the domed surface 54 toward the perforated rim 62, at which point it exits the dispenser 20. The actuator 46 can then be released to enable the spring 104 to once again bring apertures 82 and 83 into alignment to initiate a subsequent "fill" phase. The dispensing cycle can be repeated as desired to produce a desired amount of granular material.

The invention has been described in connection with what are presently considered to be the most practical and preferred embodiments. However, the present invention has been presented by way of illustration and is not intended to be limited to the disclosed embodiments. For example, it should be appreciated that many configurations may be available to produce a variable-size chamber that may be filled with solid material from a container and subsequently dispensed. Accordingly, the present invention is not intended to be limited to the embodiment illustrated, but instead is intended to cover any arrangement that enables a predetermined volume of material to be dispensed that is selectively variable. The scope of the present invention is defined by the following claims.

I claim:

1. A dispenser comprising:
   a container capable of housing a volume of material, wherein the container is partially defined by a container wall having an aperture extending therethrough; and
   a dispensing assembly including:
   i. a housing;
   ii. a sliding member disposed in the housing, wherein the sliding member includes a chamber having an open top in selective communication with the aperture and an open bottom, the chamber being defined by first and second sidewalls and first and second end walls, and wherein at least one set of elongated grooves is formed in an inner surface of the sidewalls and positioned between the first and second end walls; and
   iii. an insert configured to be installed within the chamber in one of a plurality of predetermined configurations to define a predefined metered volume in the chamber that is adjustable depending on the configuration of the insert, the insert being defined by insert walls having at least one set of guide rails sized to fit within the elongated grooves, the set of guide rails being positioned off-center with respect to the insert walls such that the orientation of the insert when installed in the grooves controls the volume of the chamber;
   wherein the sliding member is movable between a first position whereby material is delivered from the container into the chamber and a second position whereby the delivered material is dispensed from the chamber.

2. The dispenser as recited in claim 1, wherein the dispensing assembly further comprises a stationary plate aligned with the open bottom of the chamber to provide a base for the chamber when the sliding member is in the first position.

3. The dispenser as recited in claim 2, wherein the open top of the chamber is in alignment with the aperture when the sliding member is in the first position.

4. The dispenser as recited in claim 3, wherein when the sliding block is in the second position, the open top is removed from alignment with the aperture, and the plate is removed from alignment with the open bottom of the chamber.

5. The dispenser as recited in claim 1, wherein the dispensing assembly further comprises a spring that is operatively connected to the housing at one end and operatively connected to the sliding member at a second end, and wherein the spring biases the sliding member towards the first position.

6. The dispenser as recited in claim 1, wherein the chamber includes more than one set of grooves displaced from one another such that the insert is installed in either set of grooves to control the volume of the chamber.

7. The dispenser as recited in claim 1, further comprising a diffuser attached to the housing, the diffuser comprising a perforated outer rim and a domed base for directing material received from the chamber assembly to the outer rim.

8. The dispenser as recited in claim 1, wherein the sliding member further comprises an actuator extending outwardly from the housing that can be depressed to translate the sliding member between the first and second positions.

9. A dispensing assembly for attachment to a container housing a granular material and having an outlet for the delivery of the material, the dispensing assembly comprising:
   a slideable member having first and second sidewalls and first and second end walls that define a chamber having an open top and an open base;
   a plate disposed beneath the open base;
   at least one set of elongated grooves formed in an inner surface of the sidewalls and positioned between the first and second end walls; and
   an insert at least partially defined by a pair of opposing end walls, wherein at least one set of elongated guide rails is disposed on the end walls and configured to be slid into the set of elongated grooves between the first and second end walls to control the volume of the chamber.

10. The dispensing assembly as recited in claim 9, further comprising a housing at least partially defined by a sidewall having an aperture extending therethrough, wherein the slideable member extends at least partially through the aperture.

11. The dispensing assembly as recited in claim 10, further comprising a spring member having a first end and a second end wherein the first end is operatively connected to the housing, and the second end is operatively connected to the slideable member.

12. The dispensing assembly as recited in claim 11, wherein the slideable member is movable from a first position whereby the open base is aligned with the plate to a second position whereby the open base is removed from alignment with the plate.

13. The dispensing assembly as recited in claim 12, further comprising a diffuser attached to the housing.

* * * * *